United States Patent

[11] 3,627,600

[72] Inventor Donald Peter Reiter
 Akron, Ohio
[21] Appl. No. 817,835
[22] Filed Apr. 21, 1969
[45] Patented Dec. 14, 1971
[73] Assignee E. I. du Pont de Nemours and Company
 Wilmington, Del.

[54] PROCESS OF FASTENING PLASTIC OR ELASTIC SHEETS
 6 Claims, 4 Drawing Figs.

[52] U.S. Cl. .................................................. 156/66,
 24/201 C
[51] Int. Cl. ................................................... A44b 19/02
[50] Field of Search .......................................... 156/293,
 66, 92, 93, 331, 334; 24/201 C

[56] References Cited
 UNITED STATES PATENTS
 2,960,561 11/1960 Plummer ..................... 24/201 C
 3,179,554 4/1965 Gladding et al. ............. 156/333
 3,503,934 3/1970 Chelvers ..................... 156/331

Primary Examiner—Benjamin A. Borchelt
Assistant Examiner—Harold Tudor
Attorney—Louis Del Vecchio ABSTRACT: Flexible plastic or elastic sheets having marginal interlocking portions of longitudinally extending projections and channels are fastened together by progressively mating the sheets with a slide fastener so that the projections of one sheet fit into the channels of another while concurrently exuding a cement into the portion being mated.

PATENTED DEC 14 1971 3,627,600

INVENTOR
DONALD PETER REITER

BY *Louis Del Vecchio*

ATTORNEY

PROCESS OF FASTENING PLASTIC OR ELASTIC SHEETS

BACKGROUND OF THE INVENTION

It is known that large quantities of liquid can be stored by containing the liquid in a flexible, liquid-impermeable membrane. Typical uses include liners for ponds, pits, reservoirs, and swimming pools. Materials useful for making such membranes are plastic or elastomeric sheets. But the required size of the membrane is generally larger than the size of sheet capable of being commercially and economically manufactured. Therefore, many sheets must be joined in mosaic fashion to form a membrane of the desired size and this is preferably done in the field.

There are known techniques of joining plastic or elastomeric sheets in the field, and one convenient way is to join the sheets in zipper fashion by a mechanical interlock of the marginal portions of the sheets. Although this is a convenient technique, it is not satisfactory because the mechanical interlock can unlock when the joint is subjected to high enough forces and even when properly locked the joints are not liquid tight and tend to leak. Another method, well known to the art, is the adhesive or solvent welding of lapped or taped joints. This, however, requires that the joint be held together until the bond is formed. Holding is difficult to perform in the field and provides an unnecessary delay during installation. Therefore, there is a need for a continuous and speedy process of joining plastic or elastomeric sheets in such a fashion that they are strong and liquid tight at the joint.

SUMMARY OF THE INVENTION

Accordingly, this invention provides a continuous process of uniting plastic or elastomeric sheets having marginal interlocking portions of longitudinally extending projections and channels by progressively mating the interlocking portions with a slide fastener device so that the projections of one fit into the channels of another while concurrently exuding a cement into the portion being mated.

DETAILS OF THE INVENTION

Figure 1:
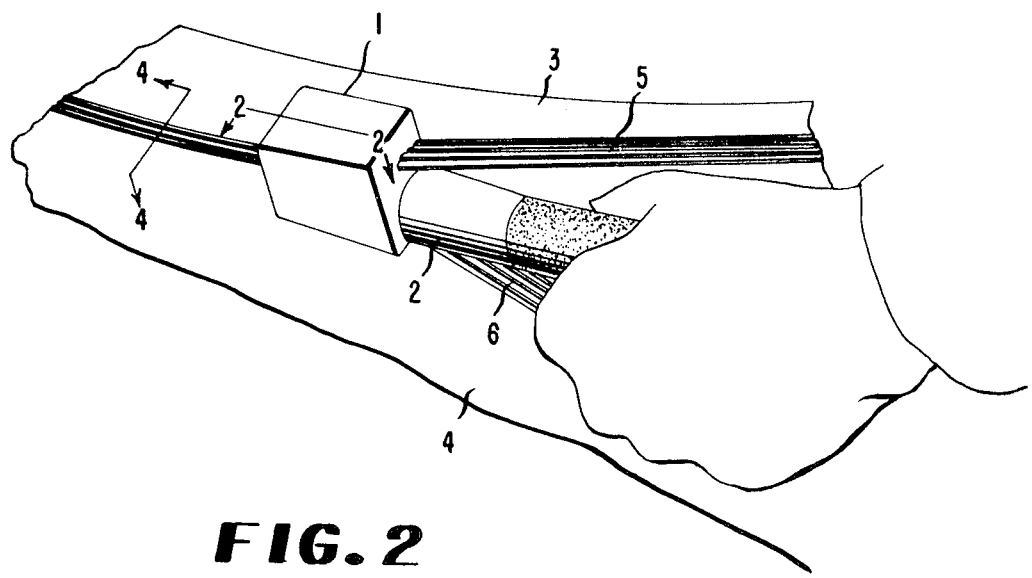
FIG. 1 is an isometric view of a slide fastener assembly used to fasten two matching strips.

The details of this invention will now be described in conjunction with the accompanying drawings. The drawings illustrate a preferred embodiment and similar parts have similar reference numerals throughout the several drawings. Referring now to the drawings, FIG. 1 shows a slide fastener assembly 1 drawn by handle 2 engaging strips 3 and 4 along the marginal interlocking portions 5 and 6, respectively.

Figure 2:
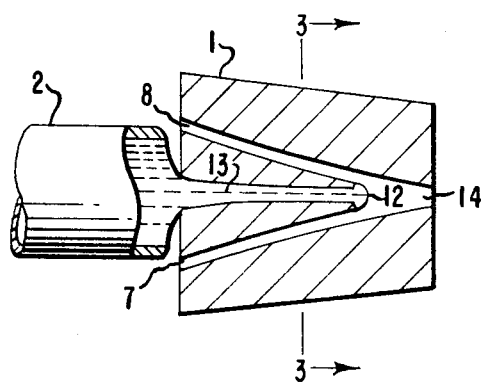
FIG. 2 is a cross-sectional view of the slide fastener taken along line 2—2 of FIG. 1.
Figure 3:
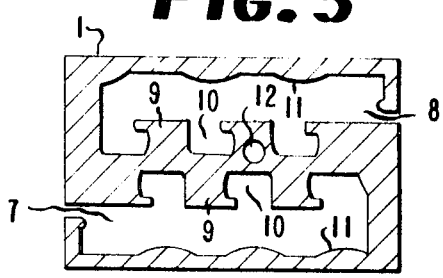
FIG. 3 is a cross-sectional view of the slide fastener taken along line 3—3 of FIG. 2.

The slide fastener assembly 1 is more particularly illustrated in FIG. 2 and FIG. 3. It contains elongated passageways 7 and 8 each having an open slot on opposite sides of the slide fastener and shaped with projections 9 and channels 10 for receiving and guiding the marginal interlocking portions 5 and 6 into engagement. Projections 11 are guides used to assist in proper tracking of the fastener. Passageways 7 and 8 are inclined to converge on each other to form a common passageway 14 which forces the marginal interlocking portions 5 and 6 to interlock. At the point where inclined passageways 7 and 8 meet, an opening 12 is provided through which a cement is exuded into the marginal interlocking portions 5 and 6 being mated. The cement is continuously fed from a reservoir, not shown, through a hose, not shown, into the hollow portion of handle 2, through passageway 13 in the slide fastener assembly 1 and out through opening 12. As the slide fastener assembly 1 is drawn, it continuously engages and cements together marginal interlocking portions 5 and 6 which then exit the fastener assembly through common passageway 14.

Figure 4:
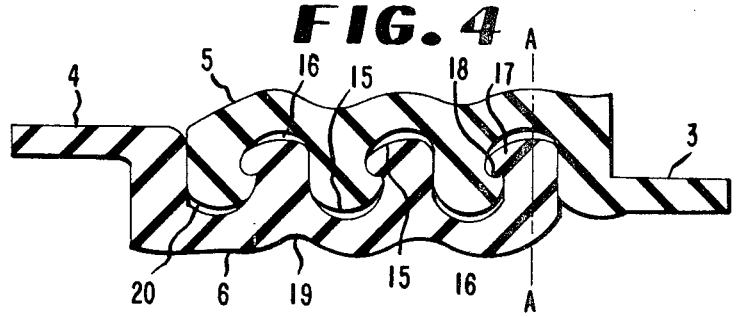
FIG. 4 is a cross-sectional view of the interlocked trips taken along 4—4 of FIG. 1.

As illustrated in FIG. 4, the coacting strips united by the slide fastener assembly are designed to interlock with each other and are provided with alternate series of projections 15 and channels 16 whereby the strips are interlocked by inverting one of the strips with respect to the other and engaging the projections of one strip with the channels of the other.

The coacting strips are made by extruding the material for the strips through a suitable die as a continuous strip after which appropriate lengths may be cut from the strip and used as a mating pair.

The die used determines the shape of the projections and channels. The projections and channels should be of such a geometric shape that they are capable of being interlocked by a slide fastener in zipper fashion to form a mechanical lock. When the coacting strips are interlocked it is preferred that a clearance exist between the end of the projections and the bottom of the channels to provide room for the cement. Useful projections and ridges can be those having a cross section in the configuration of a trapezoid, a dog leg or a mushroom. Various configurations are shown in U.S. Pat. Nos. 2,715,254; 2,797,463; 2,871,539; and 2,777,181. A preferred configuration is shown in FIG. 4 of the drawings and is described in U.S. Pat. No. 2,613,421.

As shown in FIG. 4, the projections 15 include a substantially rigid, smoothly contoured body portion and an overhanging portion 17 that is toothlike in cross section and has a reentrantly inclined surface 18 extending the length of the strip. The reentrantly inclined surface 18 is preferably a plane and slopes away from the height axis of its projection toward the bottom of the adjacent groove which said reentrant surface overhangs. The outer surfaces of the marginal interlocking portions 5 and 6 opposite the head end of the projections 15 are slightly recessed, as indicated at 19 for increasing the flexibility of the marginal portions and to provide a guide for the slide fastener assembly.

As will be obvious from an inspection of FIG. 4, when the fastener strips are in mated engagement, the projections on one of the strips are interlocked with the corresponding channels 16 of the other strip, with the reentrantly inclined surfaces 18 in opposed relationship in abutting contact with each other. The major height axis, indicated by the broken line A—A of each of the projections 15, is substantially perpendicular to the planes of the webs 3 and 4. This feature is important in that when forces are applied in opposite directions to the webs 3 and 4, along the plane of the webs, there is little tendency for the projections to become disengaged.

When the strips are interlocked and the reentrant surfaces are in opposed abutting contact, there is clearance between the ends of the projections and the bottoms of the corresponding channels, as indicated at 20. This clearance provides room for the cement. The cement can be conventional adhesive or a solvent to weld the interlocked portions together. Solvents include bodied solvents, i.e. a solvent for the membrane containing solids of the membrane material. Solvent welding of the marginal interlocking portions is a preferred method of cementing two strips together because the strips fuse together forming a membrane of one continuous material.

Since it is difficult to manufacture a sheet of plastic or elastomer having a marginal interlocking portion, the general procedure is to manufacture the sheet, extrude a strip having a marginal interlocking portion and attach the strip to the edge of the sheet. The strip can be attached to the sheet by conventional means such as heat sealing, dielectric welding, solvent welding or applying a cement. The sheet and strip are generally made of the same material, however, this is not essential to the practice of this invention.

Suitable materials for manufacturing the sheets and the strips include both plastics and elastomers which are flexible.

A preferred class of elastomers is chlorosulfonated polyethylenes, because they can be cemented together with an inexpensive solvent and are relatively oil resistant. A particularly useful chlorosulfonated polyethylene has a chlorine content within the range of 22.5 to 27.5 weight percent, and a sulfur content within the range of 0.85 to 1.15 weight percent.

Other useful elastomers include ethylene/propylene (EP) copolymers, ethylene/another α-olefin/diene (EODM) copolymer where the diene is preferably nonconjugated and has only one readily polymerizable double bond and in particular, ethylene/propylene/diene (EPDM) copolymers where the diene contains six to 22 carbon atoms, e.g., ethylene/propylene/1,4-hexadiene. The EPDM and EODM elastomers are used in the vulcanized state and can be vulcanized by conventional means.

Still other elastomers which can be used are butyl rubber, styrene/butadiene rubber and neoprines.

Of the plastics, the thermoplastic vinyl types are useful such as polyvinyl chloride, polyvinyl acetate, polyvinyl chloride/polyvinyl acetate, polyvinyl chloride/nitrile and similar vinyl resins. Blends of plastics and elastomeric materials are also useable such as polyvinyl chloride blended with butadiene acrylonitrile copolymer.

The following examples illustrate this invention. All arts and percentages are by weight unless otherwise indicated. The samples were tested by a Peel Test and a Transverse Loading Test.

Peel Test

Mated strips are placed in an Instron Tester—Model TM made by Instron Corp. One end is separated and a force applied to peel the strips apart in the direction that the interlocking portion is coupled. The amount of force necessary to peel apart the joint is measured and recorded.

Transverse Loading Test

A sample, 1 inch wide, is cut from mated strips transverse to the direction that the marginal interlocking portion is mated. A force is applied to the sample in a direction transverse to the direction that the marginal interlocking portion is coupled. The amount of force necessary to unlock the joint is measured and recorded.

EXAMPLE 1

An elastomeric compound is made by conventional techniques according to the following formulation:

| | |
|---|---|
| chlorosulfonated polyethylene (chlorine content of about 23.5 wt. percent; sulfur content about 0.95) | 100 |
| magnesium oxide | 4 |
| medium thermal black | 80 |
| furnace black | 20 |
| polyethylene (molecular wt. 1500, softening pt. 119.5° C.) (PE 617—Allied Chemical Corp.) | 5 |
| polyethyleneether glycol (mol. wt. 4,000) ("Carbowax 4,000"—Union Carbide Corp. | 1 |
| mixed fatty acid amides (Kemstrene Amides—Humko Products Div. of National Dairy Products Corp. | 0.6 |

After compounding, the uncured stock is extruded through a die forming a strip having a marginal portion of projections and channels as illustrated in FIG. 4.

Strips of equal length are cut for testing. Two strips are mated in zipper fashion by the slide fastener assembly shown in FIG. 1, FIG. 2 and FIG. 3 while concurrently exuding a cement into the portion to be mated. The cement is a solvent, trichloroethylene containing 15 percent solids by weight. The solids consist of the same chlorosulfonated polyethylene elastomer used to make the strips.

For comparative purposes sample A is prepared in the same manner except that no cement is exuded into the portion to be mated.

Table I shows the results of testing:

TABLE I

| | Example | Sample A* |
|---|---|---|
| Peel test (lbs.) | 32 (sample tears) | 0.2 |
| Transverse loading test (lbs.) | 32 (sample tears) | 17 |

*outside the scope of this invention

EXAMPLE 2

A thermoplastic composition of polyvinylchloride was prepared and extruded through a die forming a strip having a marginal portion of projections and channels as illustrated in FIG. 4.

Strips of equal length are cut for testing. Two strips are mated in zipper fashion by the slide assembly shown in FIG. 1, FIG. 2 and FIG. 3, while concurrently exuding a cement into the portion to be mated. The cement is an adhesive made of a solution of 40 weight percent methyl ethyl ketone and 40 weight percent tetrahydrofuran and 20 weight percent solids. The solids are a thermoplastic polyurethane.

For comparative purposes sample B is prepared in the same manner except that no cement is exuded into the portions to be mated.

Table II below shows the results of testing:

TABLE II

| | Example | Sample B* |
|---|---|---|
| Peel test (lbs.) | 17 | 2 |
| Transverse loading test (lbs.) | 48 | 25 |

*outside the scope of this invention.

I claim:

1. A continuous process of uniting flexible strips having marginal interlocking portions by progressively mating the marginal interlocking portions with a slide fastener device while concurrently exuding a cement into the portion of the strips being mated.

2. A process of claim 1 in which the marginal interlocking portions are alternating projections and channels that mate by introducing the projections of one strip into the channels of another strip.

3. A process of claim 2 in which the projections have a reentrant surface sloping away from the height axis of such projection toward the bottom of the adjacent complementing channel which the reentrant surface overhangs and the reentrant surfaces of the projections on the marginal portion of one strip in opposed abutting relationship with matching reentrant surfaces on another sheet with a clearance between the end of the projections and the bottoms of the channels when the strips are mated.

4. A process of claim 2 in which the flexible strips are an elastomer made of chlorosulfonated polyethylene and the cement is tricholorethylene containing 5–30 percent solids of the chlorosulfonated polyethylene elastomer.

5. A process of claim 2 in which the flexible strips are plastic and are made of polyvinyl chloride and the cement is an adhesive made of a solution of 35–45 weight percent methyl ethyl ketone, 35–45 weight percent tetrahydrofuran and 10–30 weight percent solids of a thermoplastic polyurethane.

6. A process of claim 2 in which the cement is exuded as a fine stream between the interlocking portions at a point just before said projections of one strip are progressively introduced into said channels of another strip.

* * * * *